Figure 2:
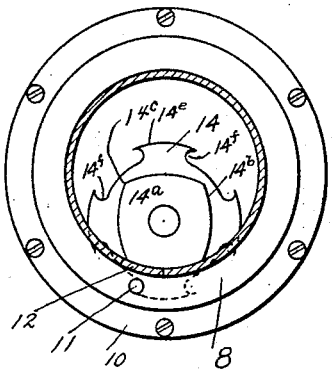

W. STEVENS.
MECHANICAL MOVEMENT.
APPLICATION FILED FEB. 3, 1914.

1,177,970.

Patented Apr. 4, 1916.

Witnesses,
H. Gearing
Alfred H. Daehler.

Inventor,
William Stevens,
By
His Attorney.

UNITED STATES PATENT OFFICE.

WILLIAM STEVENS, OF LOS ANGELES, CALIFORNIA, ASSIGNOR OF ONE-HALF TO SAMUEL M. BARNES, OF SANTA ANA, CALIFORNIA.

MECHANICAL MOVEMENT.

1,177,970.  Specification of Letters Patent.  Patented Apr. 4, 1916.

Application filed February 3, 1914. Serial No. 816,230.

*To all whom it may concern:*

Be it known that I, WILLIAM STEVENS, a citizen of the United States, residing at Los Angeles, in the county of Los Angeles and State of California, have invented new and useful Improvements in Mechanical Movements, of which the following is a specification.

This invention relates to mechanical movements, and it has for its object to provide a new mechanical movement whereby intermittent motion, in either direction, with relatively long dwells or periods of rest between relatively brief periods of movement, may be obtained. A mechanical movement of this nature is highly desirable for cameras and apparatus for taking and projecting pictures of moving objects, the film or strip of image-receiving and image-projecting material being caused to move so as to produce a minimum of blur in both taking and projecting the pictures.

The invention has for its object to provide a new mechanical movement of the general characteristics above stated, which will be superior in point of relative simplicity and inexpensiveness of construction and organization, taken in connection with positiveness of operation, freedom from liability to get out of repair, length of life, and compactness in form, and which will be generally superior in efficiency and serviceability and adaptability to varying classes and conditions of service.

The invention consists in the novel and useful provision, formation, combination, association and relative arrangement of parts, members and features, all as hereinafter described, shown in the drawing, and finally pointed out in claims.

Figure 1:
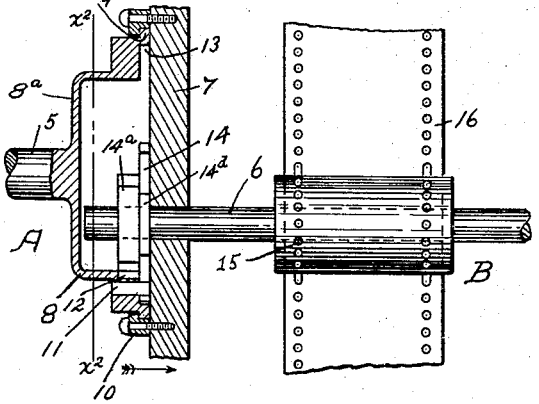
Figure 3:
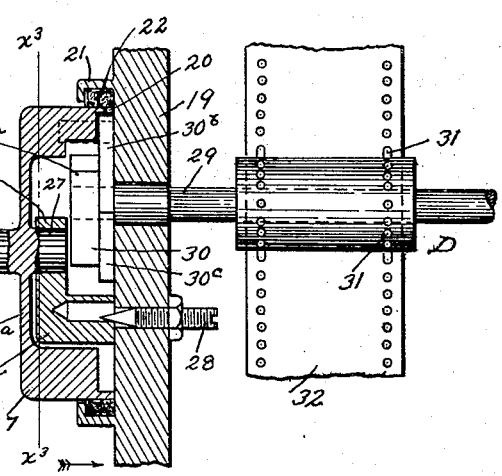

In the drawing: Figure 1 is a sectional view partly broken away and partly in full lines, of a mechanical movement embodying the invention, and of a portion of a moving picture film applied to the same for actuation; Fig. 2 is a transverse sectional view of the same, taken upon the lines $x^2$—$x^2$, Fig. 1, and looking in the direction of the appended arrow; Fig. 3 is a view similar to Fig. 1 of a modified construction; and Fig. 4 is a view similar to Fig. 2 taken upon the line $x^3$—$x^3$, Fig. 3, and looking in the direction of the appended arrow.

Figure 4:
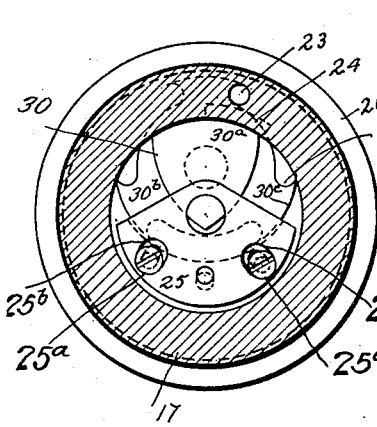

Corresponding parts in Figs. 1 and 2, and corresponding parts in Figs. 3 and 4 are designated by the same reference characters.

Referring with particularity to the drawing, and to Figs. 1 and 2 thereof, the form of mechanical movement therein shown comprises a driving member A and a driven member B, which are respectively provided with shafts 5 and 6, the axes of which are out of alinement. The members are shown as mounted upon a plate or support 7. The member A comprises an annular cup-shaped body 8 having a peripheral rim flange 9 rotatably received within a guide or guides 10 upon the support 7. The shaft 5 springs centrally from the annular body 8, being directed away from the support 7. The body 8 is provided at one side with a pin 11 and with a notch or recess 12 in registration therewith, both of which coöperate with the driven member B as hereinafter described. The body is provided with an annular flange 13 within which the pin 11 and notch 12 are disposed and which abuts against the plate 7. The driven member B comprises a two-part irregular body 14, fixed to the shaft 6 which projects centrally therefrom through a suitable bearing in the plate 7. One part $14^a$, of the body 14, namely that part presented toward the cup-shaped body 8 or central portion $8^a$ thereof, has a plurality of curved faces $14^b$, of equal length, shown as four in number, the arcs of such faces being mutually interrupting and plotted with the same radius and from four equi-distant centers. This body portion coöperates with the notch 12, at the angles or points of convergence $14^c$ whereat the faces $14^a$ merge each into the next adjacent. The body portion $14^d$ comprises a plurality of equi-distant radial projections $14^e$ upon a flat faced disk, which is presented to the plate 7. These projections are slightly recessed each, at each side, as at $14^f$, to closely coöperate with and fit the rounded pin 11. The faces $14^b$ sweep the interior periphery of the annulus 8. The shaft 6 springs centrally from the body 14, and beyond the plate 7 may be provided with teeth or sprockets or the like 15 for engagement with a moving picture film or the like 16, to actuate the same. In the operation of this form of the mechanical movement, rotation of the shaft 5 brings the pin 11 into engagement with one of the projections 14$^e$, in one of the recesses 14$^f$, initiating rotation of the body 14, which rotation is continued by immediate subsequent engagement of one wall of the recess 12 with one of the noses or corners of the body portion 14$^a$. This engagement completes a pre-determined movement of the member B, amounting to a quarter turn of the shaft 6. The shaft 6 is stationary during approximately twelve-thirteenths of a complete rotation of the shaft 5, and moves quickly through substantially one-thirteenth of such rotation, to the extent of a quarter turn. Thus the intermittent actuation of the shaft 6, while being quick and sharp, alternates with relatively long periods of idleness. The actuated device, or object such as the film 16, is thus very quickly moved or advanced from station to station, or position to position, in accompaniment with intermittent or alternating stages of complete rest. Thus, in moving picture practice, a clear distinct series of images is projected upon the screen, the blur incident to shifting of the film portion being largely eliminated.

Referring to the form of construction shown in Figs. 3 and 4, C designates the driving part and D designates the driven part. The drive member comprises an annular cup-shaped body 17 from the center portion of the face 17$^a$ of which springs a drive shaft 18. The body 17 abuts against a plate or base 19, through a rim flange 20, and is held to the plate 19 by a guide or guides 21 which embrace a packing ring 22. One side of the body 17 carries a pin 23 which is in registration with a notch or recess 24 which pin and nose coöperate with the driven member D as about to be described. A bracket 25 is disposed within the cup-shaped body 17, having a bearing 26 which receives a stub shaft 27 in alinement with the shaft 18 and within the body 17; and an adjusting screw 28 passed through the plate or base 19 coöperates with said bracket to permit tightening up or loosening the drive member C. The screw 28 has a pointed end which eccentrically engages a recess in the bracket 25 so that by tightening the screw the annular member will be brought into a tighter fractional engagement with its bearings and any objectional looseness taken up. The bracket 25 is supported by screws 25$^a$ passing through elongated apertures 25$^b$ in the bracket 25 and into the base or plate 19, and such screws 25$^a$ are loosened when making adjustment of the bracket by turning the screw 28 to force the bearing surfaces into proper working adjustment, the screws 25$^a$ being again tightened after such adjustment has been made, thereby clamping the bracket between the heads of the screws 25$^a$ and the base or plate 19. The driven member D comprises a shaft 29 journaled in the base 19 and carrying within the cup-shaped body 17 a two-part body 30, one part 30$^a$ of which has a flat outer face and a periphery consisting of three mutually interrupting arcs of equal length and produced to the same radius from equi-distant centers. The other body portion, 30$^b$, comprises a central portion having a flat face in engagement with the plate 19 and having a plurality of radial projections 30$^c$ which are relatively equi-distant and each of which at each side is slightly recessed as at 30$^d$. The shaft 29 is out of alinement with the shaft 18. The body part 30$^a$ sweeps the interior periphery of the annulus 17. In operation, rotation of the shaft 18 causes rotation of the body 17, and rotation of the body 30, which is initiated by the pin 23 engaging one of the radial projections 30$^c$ in one of the recesses 30$^d$, whereupon almost immediately the notch 24 engages with one of the noses between merging peripherial curved portions 30$^a$, the total actuation of the body 30 thus causing a third of a turn of the shaft 29. The driven member D is idle through nine-tenths of a complete rotation of the drive member C, and moves to complete a one-third rotation during one-tenth of such rotation of the drive member C. Pins or sprockets or the like 31 may be applied to the driven shaft 29, for engagement with the motion picture film 32 or other driven or actuated device. In this form of construction a like quickness of actuation and a long dwell or period of inaction after each actuation is provided, with all the advantages set forth in connection with the construction shown in Figs. 1 and 2.

In each form of construction the pin 11 or 22 very quickly initiates the actuation of the driven member, and such initiation is immediately followed by the final phase of actuation. In either form of construction it is evident that the driven member may be actuated in either direction by the driving member, as the pin 11 and notch 12 coöperate identically with the body portion 14$^b$ and 14$^a$ in either direction of motion; and the same is true with respect to the pin 22 and notch 24 and the body portion 30$^b$ and 30$^a$. After each actuation the member B or D remains locked until a subsequent actuation commences.

In prior Letters Patent of the United States issued to me June 20, 1899, Number 627,241, I have shown a mechanical movement with respect to which the present mechanical movement is a radical departure. In said patented movement I obtain only a two to one ratio between the drive and driven members, and the driven member is capable of actuation in only one direction. The movement shown in said patent is a distinct and separate entity from the present disclosure.

It is manifest that many variations in form of construction, and in method of application and in combination of parts and features, and in character of service, may be made, with respect to the present disclosure, or within a fair spirit of interpretation of the invention.

Having thus disclosed my invention, I claim and desire to secure by Letters Patent:

1. A mechanical movement including an annular rotatable member having a recess in one side of the interior periphery thereof and provided with a projection, and a second rotatable member arranged eccentrically within the annular member and comprising a two part body, one part of which is formed with intersecting arcuate edges arranged to be brought successively into engagement with the inner periphery of the annular member to lock the second member against rotation until the recess permits another arcuate edge to be brought into operative position, while the other part of the body is formed with radial projections adapted to be successively engaged by the before mentioned projection of the annular member and arranged in coöperative relation to the arcuate edges.

2. A mechanical movement including an annular rotatable member provided with an interior peripheral wall and an annular clearance space, said peripheral wall having a recess at one side thereof, a projection extending into the clearance space and carried by the annular member, and a second rotatable member arranged eccentrically within the annular member and comprising a two part body, one part being formed with a plurality of intersecting arcuate edges arranged for successive engagement with the peripheral wall of the annular member to lock the second member against rotation, while the other part is formed with radial projections which project into the before mentioned clearance space of the annular member and are successively engaged by the before mentioned projection to rotate the second member and bring another arcuate edge thereof into operative position each time the recess is brought into position to permit such rotation of the second member.

3. A mechanical movement including an annular rotatable member provided with an interior peripheral wall and an annular clearance space, said peripheral wall having a recess in one side thereof, a projection carried by the annular member and extending into the clearance space, and a second rotatable member mounted eccentrically within the annular member and comprising a two part body, one part thereof having a plurality of intersecting arcuate edges arranged for successive engagement with the peripheral wall of the annular member to lock the second member against rotation, while the other part is provided with a radial projection for each arcuate edge, said radial projections traveling in the before mentioned clearance space of the annular member and provided with seats for successive engagement with the before mentioned projection of the annular member to rotate the second member and bring another arcuate edge into operative position each time the recess in the annular member is brought into position to permit such rotation of the second member.

4. A mechanical movement including an annular rotatable member provided with an interior peripheral wall and an annular clearance space, said peripheral wall having a recess at one side thereof, a pin carried by the annular member and extending into the clearance space, and a second rotatable member mounted eccentrically within the annular member and comprising a two part body, one part thereof having a plurality of intersecting arcuate edges arranged for successive engagement with the peripheral wall of the annular member to lock the second member against rotation, while the other part is formed with a radial projection for each arcuate edge, said radial projections extending into the annular clearance space of the first member and being recessed at each side for successive engagement with the before mentioned pin when the first member is rotated in either direction to rotate the second member and bring another arcuate edge into operative position each time the recess of the first member is brought into position to permit such rotation.

5. A mechanical movement including an annular rotatable member having a recess in one side of the interior periphery thereof and provided with a projection, a bearing for the annular rotatable member, adjusting means for taking up looseness within the bearing, and a second rotatable member mounted eccentrically within the annular member and comprising a two part body, one part thereof being formed with intersecting arcuate edges arranged to be brought successively into engagement with the inner periphery of the annular member to lock the second member against rotation, while the other part of the body is formed with radial projections adapted to be successively engaged by the before mentioned projection of the annular member to rotate the second member and bring another arcuate edge thereof into operative position each time the recess of the annular member is brought into position to permit such rotation.

In testimony whereof, I have signed my name to this specification in the presence of two subscribing witnesses.

WILLIAM STEVENS.

Witnesses:
  ALFRED H. DAEHLER,
  W. F. COOK.